(12) United States Patent
Light

(10) Patent No.: US 8,864,048 B1
(45) Date of Patent: Oct. 21, 2014

(54) AGRICULTURAL SPRAYER BREAKAWAY BOOM ASSEMBLY

(75) Inventor: Dan Light, Lisbon, IA (US)

(73) Assignee: 4-L Manufacturing, Inc., Lisbon, IA (US)

( * ) Notice: Subject to any disclaimer, the term of this patent is extended or adjusted under 35 U.S.C. 154(b) by 535 days.

(21) Appl. No.: 13/362,504

(22) Filed: Jan. 31, 2012

Related U.S. Application Data

(60) Provisional application No. 61/452,358, filed on Mar. 14, 2011.

(51) Int. Cl.
  *B05B 1/20*  (2006.01)
  *B05B 3/14*  (2006.01)
  *F01B 7/20*  (2006.01)

(52) U.S. Cl.
  USPC ........... 239/166; 239/159; 239/161; 239/163; 239/167; 239/172

(58) Field of Classification Search
  CPC ............ B05B 1/205; B05B 1/20; B05B 3/02; B05B 3/14; A01G 25/09; E01C 19/16; E01H 3/02
  USPC .................. 239/159, 161, 163, 166, 167, 172; 91/167 R, 169, 196, 206–209; 60/469; 92/52, 51, 53
  See application file for complete search history.

(56) References Cited

U.S. PATENT DOCUMENTS

| | | | |
|---|---|---|---|
| 6,027,039 A | 2/2000 | Mercil | |
| 6,293,475 B1 | 9/2001 | Sobolik | |
| 6,454,294 B1 | 9/2002 | Bittner et al. | |
| 6,719,213 B1 | 4/2004 | Ferguson | |
| 7,740,190 B2 * | 6/2010 | Peterson et al. | 239/166 |
| 2012/0237284 A1 * | 9/2012 | Bouten | 403/111 |

* cited by examiner

*Primary Examiner* — Justin Jonaitis
(74) *Attorney, Agent, or Firm* — Jason R. Sytsma; Shuttleworth & Ingersoll, PLC

(57) ABSTRACT

According to one embodiment, there is provided a breakaway hinge for an expandable boom on an agricultural vehicle. The boom includes of a first and a second section combined in a manner to allow the second section to move with respect to the first section when the second section encounters an obstruction. A breakaway hinge is provided between the first and the second section, and includes a first pivot member attached to the first section at an angle α with respect to a vertical line and a second pivot member attached to the second section at an angle θ with respect to the vertical line. A connecting member holds the first pivot member with respect to the second pivot member.

28 Claims, 7 Drawing Sheets

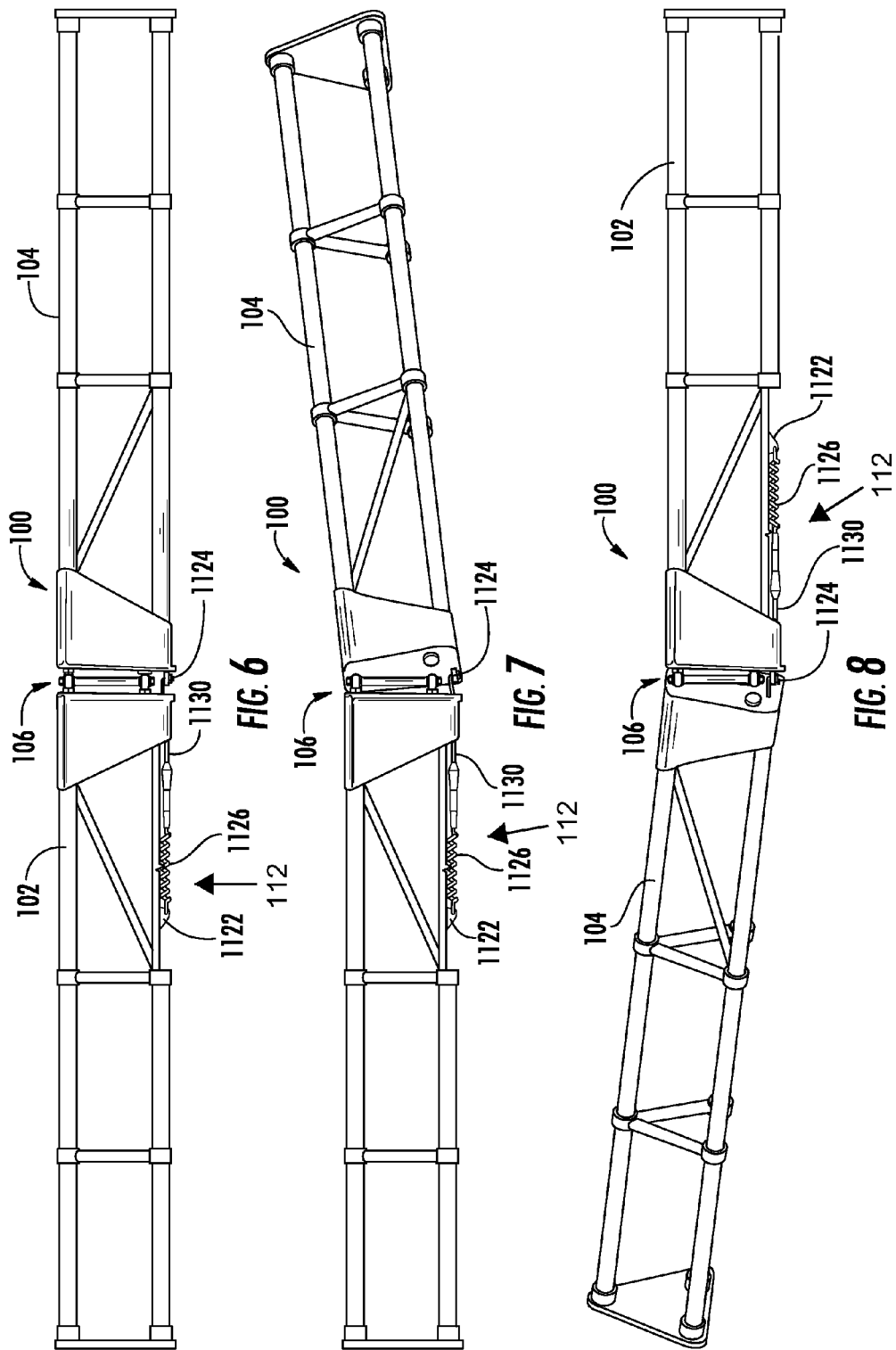

AGRICULTURAL SPRAYER BREAKAWAY BOOM ASSEMBLY

This application claims priority to U.S. Provisional Application No. 61/452,358 filed Mar. 14, 2011, the entirety of which is incorporated by reference herein.

BACKGROUND

Liquid chemicals such as, herbicides and pesticides are commonly applied by use of a sprayer having long booms. This sprayer may be attached to a tractor, placed in the rear of a pickup, or be of a self-propelled nature. Typically, these sprayers will have long booms reaching out on either side to increase the area sprayed with each pass of the vehicle. As the boom length extends out from the vehicle pulling the sprayer, the ends of the booms are subject to more up and down movement as the vehicle travels over small bumps and ruts and thus, moves from side to side. Another problem with lengthening the booms is the tendency for the driver to misjudge distances from obstacles such as power poles, trees and fences, thus, running the end of the boom into the obstacles, possibly damaging the boom and the obstacle, and causing costly down time.

The previously disclosed boom assemblies fail to disclose a breakaway mechanism that holds the inner and outer boom extensions firmly with respect to each other, while allowing the outer boom extension to move away from an obstruction regardless of the direction of travel of the sprayer or flex upward in the vertical plane to clear an obstruction.

SUMMARY

According to one embodiment, there is provided a breakaway hinge for an expandable boom on an agricultural vehicle. The boom includes an inner (first) and an outer (second) section combined in a manner to allow the outer section to move with respect to the inner section when the outer section encounters an obstruction. A breakaway hinge is provided between the inner and the outer sections, and includes a first pivot member attached to the inner section at an angle α with respect to a vertical line and a second pivot member attached to the outer section at an angle θ with respect to the vertical line. A connecting member holds the first pivot member with respect to the second pivot member. While the first pivot member remains fixed to the inner section, the outer section can pivot on either one of the first and the second pivot members. When the outer section encounters the obstruction as the agricultural sprayer vehicle is moving in a forward motion, the second section is moved upward and rearward with respect to the inner section, and thus away from the obstruction at the angle θ. When the second section encounters the obstruction as the agricultural sprayer vehicle is moving in a reverse motion, the second section is moved upward and forward with respect to the inner section, and thus away from the obstruction at the angle α.

A biasing element is provided for holding the inner and the outer sections together in a normal state position. When the second section encounters the obstruction and moves upward and away from the obstruction, the biasing element urges the second section back to the normal state position as the obstruction is cleared.

In another embodiment, two height adjustment mechanisms are provided, one opposite each of the two pivoting members. The height adjustment mechanisms engage their corresponding pivot members to position the inner and outer sections relative to each other.

BRIEF DESCRIPTION OF THE DRAWINGS

FIG. 6 is a front view of the embodiment of FIG. 1 with the outer and inner booms in the steady state position.

FIG. 7 is a front view of the embodiment of FIG. 1 with the outer boom moved upward and rearward with respect to the inner boom as though the outer boom encountered an obstruction as the vehicle is traveling forward.

FIG. 8 is a rear view of the embodiment of FIG. 1 with the outer boom moved upward and rearward with respect to the inner boom as though the outer boom encountered an obstruction as the vehicle is traveling forward.

DETAILED DESCRIPTION

Disclosed is a breakaway mechanism for an expandable boom attached to an agricultural vehicle. Such an agricultural vehicle is usually used for applying liquid chemicals to fields, such as herbicides and pesticides. The expandable boom is mounted on trailer or a self-propelled vehicle that supports a main support frame, which supports right and left foldable boom assemblies (as facing forward on the vehicle) that extend outward from the vehicle. One boom assembly is described hereinafter with the understanding that the right and left boom assemblies can be the same or mirror images of each other.

Figure 1:
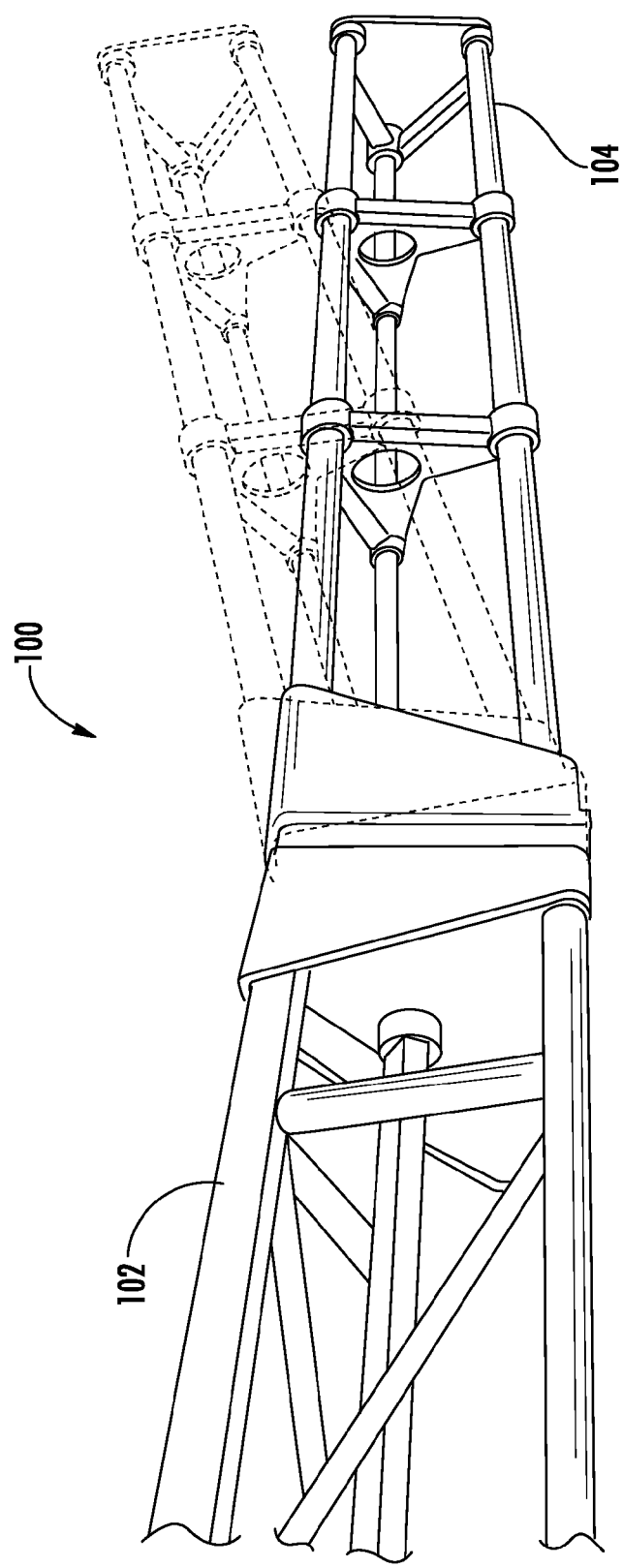
FIG. 1 is a perspective view of a breakaway boom showing how the outer boom moves with respect to the inner boom.

FIG. 1 shows a portion of a boom assembly 100, including an inner boom assembly 102, which can be a first section, connected to an outer boom assembly 104, which can be a second section, with a phantom image illustrating a path of travel for outer boom assembly 104 as it moves away to clear an obstruction. Boom assembly 100 includes inner boom assembly 102, which is attached to the agricultural vehicle (not shown) for rotational movement between an extended position substantially perpendicular to a direction of travel and preferably, a folded position substantially parallel with a direction of travel. The inner boom can also fold in other directions. Attached to the outer end of the inner boom assembly 102 is outer boom assembly 104 that extends the length of the foldable inner boom assembly 102. In one embodiment, multiple extension boom assemblies can be provided in sequence to extend the area sprayed with each pass of the vehicle.

Figure 2:
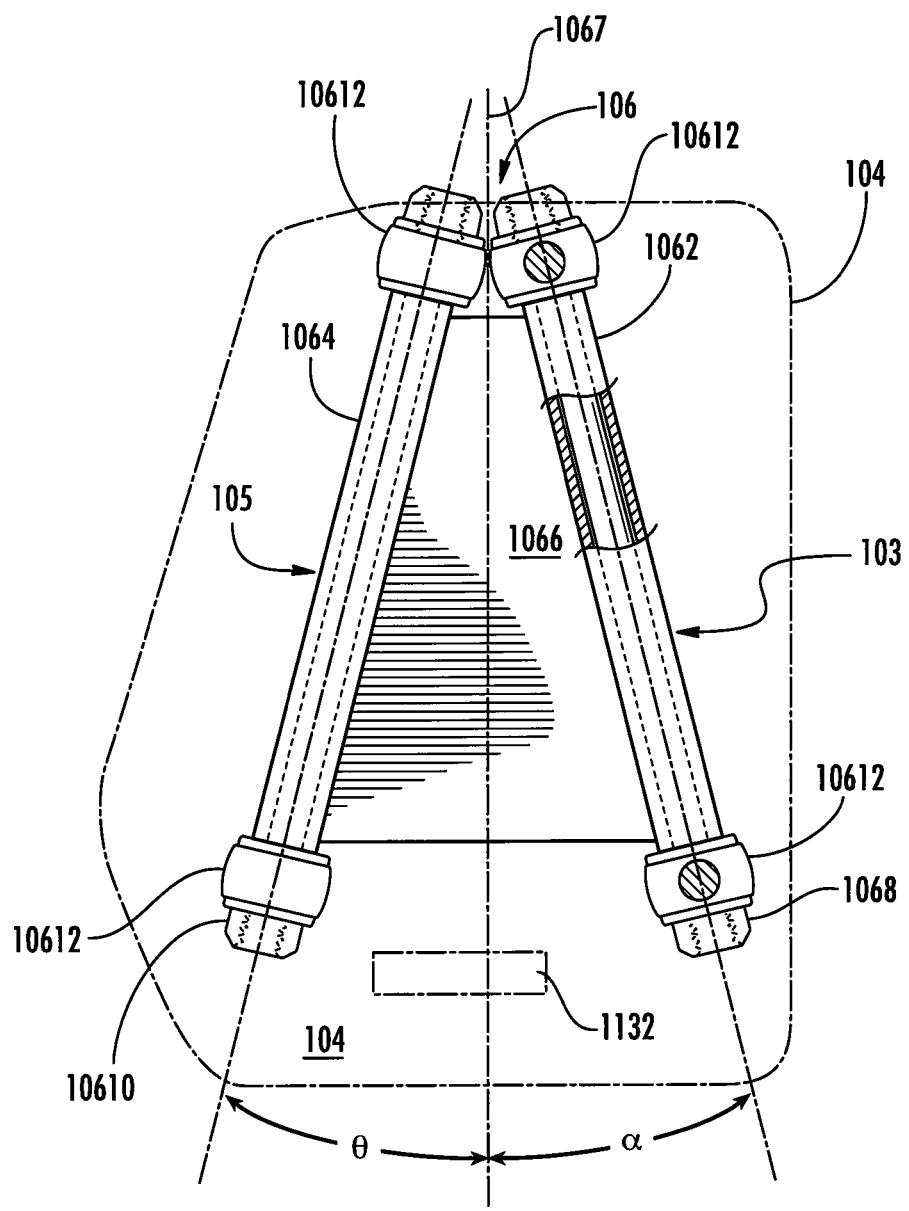
FIG. 2 is a cut-away view toward the outer boom of the embodiment shown in FIG. 1, showing a breakaway hinge.

Between inner boom assembly 102 and outer boom assembly 104 (or, alternatively the outermost extension assemblies) is a breakaway hinge 106, shown in FIG. 2, that allows outer boom assembly 104 to pivot to clear an obstruction. Breakaway hinge 106 can also be employed between the other inner extension boom assemblies.

Breakaway hinge 106 includes an A-frame structure with a first pivot member 103 and a second pivot member 105 with corresponding cylindrical rod carrying tubes 1062, 1064, respectively, attached by a generally triangular plate 1066, which can be a connecting member, positioned therebetween. FIG. 2 is a sectional view facing outer boom 104 and showing breakaway hinge 106 attached to outer boom assembly 104. Two pivoting rods 1068, 10610 are positioned in rod carrying tubes 1062, 1064, respectively, or rod carrying bores. Pivoting rod 1068 is attached to inner boom assembly 104.

Rod carrying tubes 1062, 1064 are attached to plate 1066 at an angle α and an angle θ, respectively, with respect to a centerline 1067 extending through plate 1066. Rod carrying tubes 1062, 1064, and thus pivoting rods 1068, 10610 are held with respect to centerline 1067 at the angles, α and θ. The angles, α and θ define the path of travel for outer boom assembly 104 in its forward and rearward motion. FIG. 2 shows angles α and θ at about 15 degrees. Either angle, however, can be adjusted to change the path of travel for outward boom assembly 104. Breakaway hinge 106 can be constructed as the weak point in boom assembly 100, so that it fails first. That way the cheaper component can be replaced without having to replace inner boom assembly 102 or outer boom assembly 104.

In operation, when outer boom assembly 104 encounters the obstruction as the agricultural sprayer vehicle is moving in a forward motion, outer boom assembly 104 is moved upward and rearward with respect to inner boom assembly 102, and thus away from the obstruction at the angle θ. When outer boom assembly 104 encounters the obstruction as the agricultural sprayer vehicle is moving in a reverse motion, outer boom assembly 104 is moved upward and forward with respect to inner boom assembly 102, and thus away from the obstruction at the angle α.

Pivoting rods 1068 and 10610 can be made from ⅝" round bar threaded on each end with a smooth shaft in the center. Four eyebolts 10612 can be used with one on each end of pivoting rods 1068, 10610 to attach them to their respective boom assemblies 102, 104.

Figure 3:
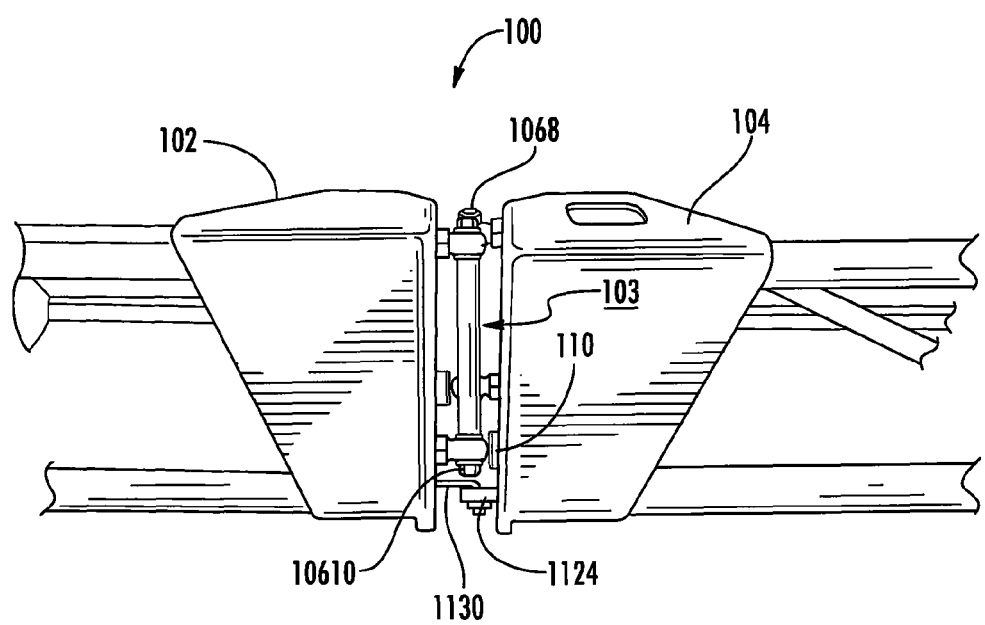
FIG. 3 is a front elevational view of the embodiment shown in FIG. 1 with a breakaway mechanism, including the breakaway hinge attached.

A biasing element 112 (shown in FIGS. 6-9) is used to hold inner and outer boom assemblies 102, 104 in the normal state position. FIGS. 3 and 6 shows inner and outer boom assemblies 102, 104 in the normal state position where the respective boom assemblies are generally aligned with respect to each other. FIGS. 6-9 show biasing element 112 with a first end 1122 fixed to inner boom assembly 102 and a second end 1124 attached to outer boom assembly to provide a biasing force to hold boom assemblies 102, 104 in the normal state position. Biasing element 112 can include a heavy-duty extension spring 1126, a hydraulic, pneumatic, or electric cylinder as well as any form of mechanical biasing element. First end 1122 of extension spring 1126 is attached to inner boom assembly 102 and a second end 1128 of extension spring 1126 is attached to a cable 1130. Cable 1130 is directed through a hole at the end of inner boom 102 where it is attached to second end 1124 on outer boom assembly 104.

When outer boom assembly 104 encounters an obstruction it moves away from the obstruction and is brought back by biasing element 112 to the normal state position after clearing the obstruction. FIG. 7 shows outer boom assembly 104 moved upward and rearward with respect to inner boom assembly 102, and thus away from the obstruction at the angle α FIG. 8 shows outer boom assembly 104 moved upward and forward with respect to inner boom assembly 102, and thus away from the obstruction at the angle α. In FIGS. 7 and 8, the biasing force from biasing element 112 brings outer boom assembly 104 back to the normal state position after the obstruction is cleared. The fact that biasing element 112 brings outer boom assembly 104 back to the normal state position means the operator does not have to leave his vehicle to re-align boom assembly 104 after it encounters an obstruction.

Biasing element 112 also holds the respective boom assemblies 102, 104 in the normal state position as the agricultural vehicle travels through the field encountering bumps and dips which might cause the respective boom assemblies 102, 104 to sway, bounce or vibrate.

Figure 9:
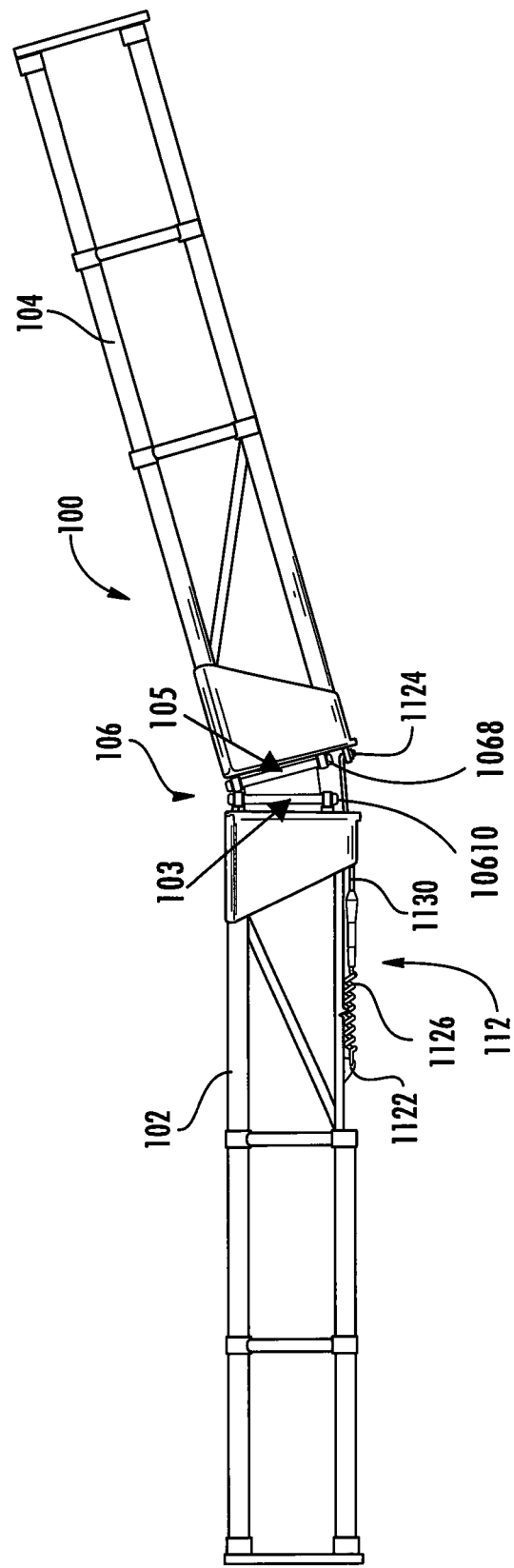
FIG. 9 is a detail view of the embodiment of FIG. 1 showing the outer boom moved upward from the inner boom.

Outer boom assembly 104 can also move solely in the vertical plane cue to the arrangement of biasing element 112 and breakaway hinge 106. FIG. 9 shows outer boom assembly 104 pivoted upward with respect to inner boom assembly 102. As outer boom assembly 104 is moved upward, pivoting rod 1068 pivots with respect to centerline 1067 and outer boom assembly 104 moves upward.

Figure 4:
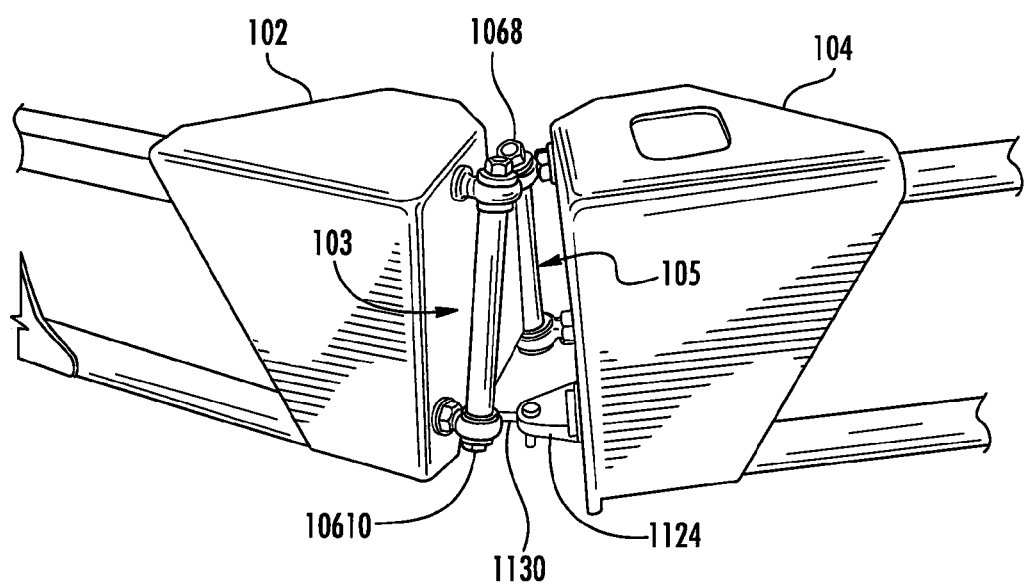
FIG. 4 is a front perspective view of the embodiment of FIG. 1 the outer boom moved upward and rearward with respect to the inner boom as though the outer boom encountered an obstruction as the vehicle is traveling forward.

FIGS. 4 and 7 show outer boom assembly 104 from the front side pivoting rearward and upward with respect to inner boom assembly 102 on pivoting rod 1068 as though clearing an obstruction while the vehicle is traveling forward. In this position, plate 1066 of breakaway hinge 100 is generally aligned perpendicular to inner boom assembly 102 and away from outer boom assembly 104.

Figure 5:
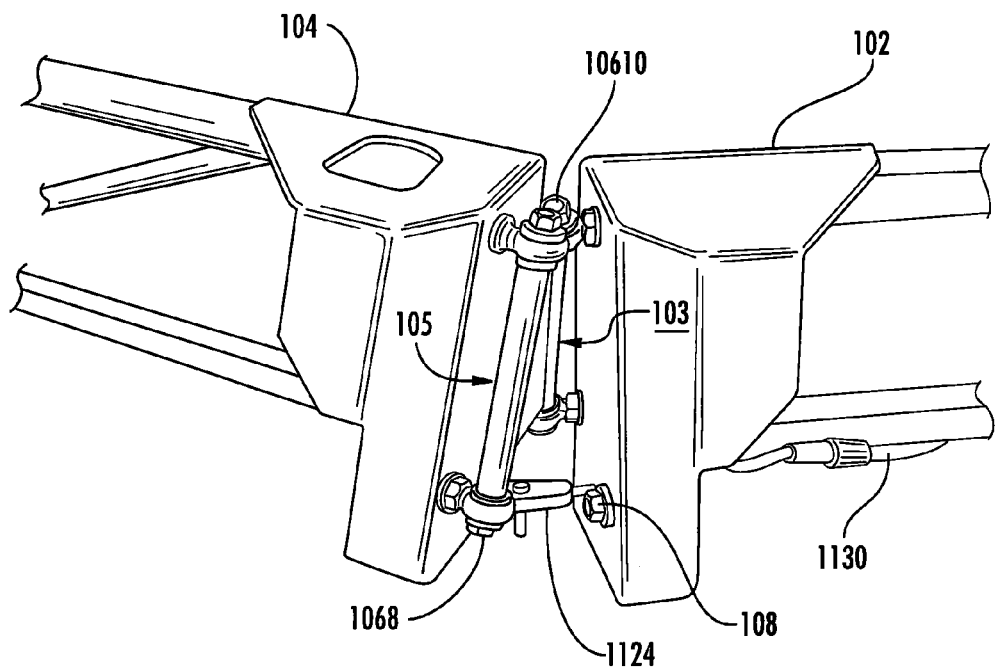
FIG. 5 is a rear perspective view of the embodiment of FIG. 1 showing the outer boom moved upward and forward with respect to the inner boom as though the outer boom encountered an obstruction as the vehicle is traveling backward.

FIGS. 5 and 8 show outer boom assembly 104 from the backside pivoting frontward and upward on pivoting rod 10610 as though clearing an obstruction while the vehicle is traveling backward. Plate 1066 of breakaway hinge 100 is generally aligned perpendicular to outer boom assembly 104 and away from inner boom assembly 102.

Inner and outer boom assemblies 102, 104 are aligned with respect to each other in the vertical plane by two height adjustment mechanisms 108 (FIG. 5), 110 (FIG. 3), with each one positioned opposite of lower eyebolts 10612 near bottom portion of pivoting rods 1068, 10610, respectively. Each pivot rod 1068 and 10610 have a top portion and a bottom portion with an axis extending therebetween. The two height adjustment mechanisms 108 and 110 are positioned with one on each of the first section 102 and the second section 104 opposite of the bottom portion of the corresponding pivot rods 1068 and 10610. FIG. 4 shows outer boom assembly 104 pivoted with respect to inner boom assembly 102 on pivot rod 1068. Height adjustment 110 is combined to outer boom assembly 104 and illustrated apart from pivot rod 10610 because outer boom assembly 104 is pivoted away. FIG. 5 shows outer boom assembly 104 pivoted with respect to inner boom assembly 102 on pivot rod 10610. Height adjustment 108 is combined to inner boom assembly 102 and illustrated apart from pivot rod 1068 because outer boom assembly is pivoted away.

FIG. 3 shows inner and outer boom assemblies 102, 104 in a normal state position. The respective boom assemblies 102, 104 are generally aligned with each other due to the positioning of height adjustments 108, 110. Height adjustments 108, 110 can be adjusted in and out of their respective extensions to affect the leveling of the boom assemblies 108, 110 with respect to each other and can be locked in the desired position in a conventional manner with washer stacks and/or lock nuts or in other ways known to those skilled in the art.

In an alternative embodiment, pivoting rods 1068, 10610 can be positioned parallel to each other and center line 1067. In this embodiment, outer boom assembly would pivot outward and not upward. A sensor is positioned on outer boom assembly 104 or between outer and inner boom assemblies, 102 and 104, respectively to alert the operator of movement of outer boom assembly 104 with respect to inner boom assembly 102 so he can stop the agricultural vehicle and move away from the obstruction. The sensor can be a limit switch or a pressure sensor that detects physical contact between the obstruction and outer boom assembly 104 or a proximity sensor to detect when the obstruction is near outer boom assembly 104 or when outer and inner boom assemblies, 102 and 104 are moved away from each other, as well as any form of sensor. The sensor is connected to a visual or auditory alarm in the cabin of the agricultural vehicle to alert the driver when outer boom assembly 104 encounters an obstruction.

Reference has been made to several components throughout this disclosure as though each component is a unique component. One skilled in the art will readily recognize, however, that the various linkages and joints can be incorporated into one or more linkages and joints thereby reducing or increasing the number of components.

Reference may also have been made throughout this disclosure to "one embodiment," "an embodiment," or "embodiments" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

While the present invention has been particularly shown and described with reference to exemplary embodiments thereof, it should be understood by those of ordinary skill in the art that various changes, substitutions and alterations can be made herein without departing from the spirit and scope of the invention as embodied by the appended claims and their equivalents.

What is claimed is:

1. A breakaway hinge between a first section and a second section of a boom for an agricultural vehicle to allow the second section to move away from an obstruction, the breakaway hinge comprising:
a first pivot member attached in constant mechanical connection to the first section at an angle $\alpha$ with respect to a vertical line;
a second pivot member attached in constant mechanical connection to the second section at an angle $\theta$ with respect to the vertical line;
a connecting member to hold the first pivot member with respect to the second pivot member so that the second section pivots on one of the first pivot member and the second pivot member and the other one of the first pivot member and the second pivot member remains fixed with respect to the one of the first pivot member and the second pivot member that pivots, wherein as the second section encounters the obstruction as the agricultural vehicle is moving in a forward motion the second section is moved upward and away from the obstruction at one of the angle $\alpha$ and the angle $\theta$, and wherein as the second section encounters the obstruction as the agricultural sprayer-vehicle is moving in a reverse motion the second section is moved upward and away from the obstruction at one of the angle $\theta$ and the angle $\alpha$.

2. The breakaway hinge of claim 1, wherein the first section and the second section have a normal state position where the first section and the second section are generally aligned with respect to each other, and further comprising a biasing element connecting the first section and the second section for providing a biasing force for urging the second section toward the normal state position.

3. The breakaway hinge of claim 2, and further comprising a height adjustment mechanism on one of the first section and second section for engaging a corresponding one of the first pivot member and the second pivot member- and providing for a height adjustment of the first section and the second section relative to each other.

4. The breakaway hinge of claim 3, and further comprising two height adjustment mechanisms, one positioned on each of the first and the second sections, wherein the first and the second pivot members each have a top and a bottom portion with an axis extending therebetween, and the two height adjustment mechanisms are positioned on the first and the second sections opposite of the bottom portion of the pivot members, wherein the two height adjustments position the respective sections relative to each other.

5. The breakaway hinge of claim 4, wherein the second section pivots on one of the first pivot member and the second pivot member with respect to the first section and the connecting member maintains an alignment of the first pivot member and the second pivot member with respect to each other.

6. The breakaway hinge of claim 5, wherein the biasing element has a first end fixed to the first section and a second end attached to the second section to provide the biasing force.

7. The breakaway hinge of claim 6, wherein the first pivot member includes a first pivot rod and the second pivot member includes a second pivot rod, wherein the first pivot rod is attached to the first section by one eyebolt at a to portion of the first pivot rod and one eyebolt at a bottom portion of the first pivot rod, and wherein the second pivot member is attached to the second section by one eyebolt at a top portion of the second pivot rod and one eyebolt at a bottom portion of the second pivot member, and wherein the eyebolt positioned at the bottom portion of the first pivot rod engages the height adjustment on the first section, and the eyebolt positioned at the bottom portion of the second pivot rod engages the height adjustment on the second section.

8. The breakaway hinge of claim 7, wherein the connecting member comprises a plate, a pair of rod carrying bores positioned on opposite ends of the plate at the angle $\alpha$ and the angle $\theta$, respectively, and wherein each of the rods is positioned within one of the rod carrying bores and extends outwardly from the rod carrying bore for attachment to the eyebolts.

9. The breakaway hinge of claim 8, wherein the angle $\alpha$ and the angle $\theta$ are each generally 15 degrees.

10. A boom for an agricultural vehicle, the boom comprising:
a first section and a second section of the boom, wherein the second section moves with respect to the first section as the second section encounters an obstruction;
a first pivot member attached in constant mechanical connection to the first section at an angle $\alpha$ with respect to a vertical line;
a second pivot member attached in constant mechanical connection to the second section at an angle $\theta$ with respect to the vertical line; and
a connecting member to hold the first pivot member with respect to the second pivot member so that the second section pivots on one of the first pivot member and the second pivot member and the other one of the first pivot member and the second pivot member remains fixed with respect to the one of the first pivot member and the second pivot member that pivots, as the second section encounters the obstruction as the agricultural vehicle is moving in a forward motion the second section is moved upward and away from the obstruction at one of the angle α and the angle θ, as the second section encounters the obstruction as the agricultural sprayer vehicle is moving in a reverse motion the second section is moved upward and away from the obstruction at one of the angle θ and the angle α.

11. The boom of claim 10, wherein the first and the second sections have a normal state position where the respective sections are generally aligned with respect to each other, and further comprising a biasing element connecting between the first and the second sections to provide a biasing force urging the first and the second section toward the normal state position.

12. The boom of claim 11, wherein the biasing element has a first end fixed to the first section and a second end attached to the second section to provide the biasing force.

13. The boom of claim 12, wherein the first pivot member is a first rod and the second pivot member is a second rod, wherein each of the first rod and the second rod is attached to a corresponding one of the first section and the second section by two eyebolts, one eyebolt is positioned at each of a top portion and a bottom portion of the first rod and the second rod, and wherein the eyebolt positioned at the bottom portion of each of the first rod and the second rod engages a height adjustment on the corresponding first section and the second section.

14. The boom of claim 13, wherein the connecting member comprises a plate, a pair of rod carrying bores positioned on opposite ends of the plate at the angle α and the angle θ, respectively, and wherein each of the rods is positioned within one of the rod carrying bores and extends outwardly from the rod carrying bore for attachment to the eyebolts.

15. The boom of claim 14, wherein the angle α and the angle θ are each generally 15 degrees.

16. The boom of claim 15, and further comprising a height adjustment mechanism on one of the first section and the second section for engaging a corresponding one of the first pivot member and the second pivot member and providing for a height adjustment of the first section and second section relative to each other.

17. The boom of claim 16, and further comprising two height adjustment mechanisms, one positioned on each of the first and the second sections, wherein the first and the second pivot members each have a top portion and a bottom portion with an axis extending therebetween, and the two height adjustment mechanisms are positioned on the first and the second sections opposite of the bottom portion of the pivot members, wherein the two height adjustments position the respective sections relative to each other.

18. The boom of claim 17, wherein the second section pivots on one of the first and the second pivot members with respect to the first section and the connecting member maintains an alignment of the first and the second pivot members with respect to each other.

19. A boom for an agricultural vehicle, the boom comprising:
a first section of the boom and a second section of the boom, wherein the second section moves with respect to the first section as the second section encounters an obstruction;
a first pivot member attached in constant mechanical connection to the first section at a generally 15 degree angle with respect to a vertical line;
a second pivot member attached in constant mechanical connection to the second section at a generally 15 degree angle with respect to the vertical line;
wherein the first section and the second section have a normal state position where the first section and the second section are generally aligned with respect to each other;
a biasing element connecting between the first section and the second section to provide a biasing force urging the first section and the second section toward the normal state position;
a connecting member to hold the first pivot member with respect to the second pivot member so that the second section pivots on one of the first pivot member and the second pivot member and the other one of the first pivot member and the second pivot member remains fixed with respect to the one of the first pivot member and the second pivot member that pivots, wherein as the second section encounters the obstruction as the agricultural vehicle is moving in a forward motion the second section is moved upward and away from the obstruction at the 15 degree angle, and wherein as the second section encounters the obstruction as the agricultural vehicle is moving in a reverse motion the second section is moved upward and away from the obstruction at the 15 degree angle.

20. The boom of claim 19, and further comprising two height adjustment mechanisms, wherein one height adjustment mechanism is positioned on the first section and a second height adjustment mechanism is positioned on the second section, wherein the first pivot member and the second pivot member each have a top portion and a bottom portion with an axis extending therebetween, and the two height adjustment mechanisms are positioned on the first section and the second section opposite of the bottom portion of a corresponding one of the first pivot member and the second pivot member pivot members, wherein the two height adjustments position the first section relative to the second section, and wherein the second section pivots on one of the first pivot member and the second pivot member with respect to the first section and the connecting member maintains an alignment of the first pivot member and the second pivot member with respect to each other.

21. A breakaway hinge between a first section and a second section of a boom for an agricultural vehicle to allow the second section to move away from an obstruction, the breakaway hinge comprising:
a first pivot member attached in constant mechanical connection to the first section at an angle with respect to a vertical line;
a second pivot member attached in constant mechanical connection to the second section at an angle with respect to the vertical line;
a connecting member to hold the first pivot member with respect to the second pivot member so that the second section pivots on one of the first pivot member and the second pivot member and the other one of the first pivot member and the second pivot member remains fixed with respect to the one of the first pivot member and the second pivot member that pivots, wherein as the second section encounters the obstruction as the agricultural vehicle is moving in a forward motion the second section is moved upward and away from the obstruction at the angle with respect to the vertical line, and wherein as the second section encounters the obstruction as the agricultural vehicle is moving in a reverse motion the second section is moved upward and away from the obstruction at the angle with respect to the vertical line.

22. The breakaway hinge of claim 21, wherein the first pivot member is attached to the first section at the angle α with respect to the vertical line and the second pivot member is attached to the second section at the angle θ with respect to the vertical line, and wherein as the second section encounters the obstruction as the agricultural vehicle is moving in a forward motion the second section is moved upward and away from the obstruction at one of the angle α and the angle θ, and wherein as the second section encounters the obstruction as the agricultural vehicle is moving in a reverse motion the second section is moved upward and away from the obstruction at one of the angle θ and the angle α.

23. The breakaway hinge of claim 22, wherein the angle α and the angle θ are each generally 15 degrees.

24. The breakaway hinge of claim 21, wherein the first section and the second section have a normal state position where the first section and the second section are generally aligned with respect to each other, and further comprising a biasing element connecting the first section and the second section for providing a biasing force for urging the second section toward the normal state position.

25. The breakaway hinge of claim 24, wherein the second section pivots on one of the first pivot member and the second pivot member with respect to the first section and the connecting member maintains an alignment of the first pivot member and the second pivot member with respect to each other.

26. The breakaway hinge of claim 25, wherein the biasing element has a first end fixed to the first section and a second end attached to the second section to provide the biasing force.

27. The breakaway hinge of claim 21, and further comprising a height adjustment mechanism including a mounting structure with a rod supporting bore on one of the first section and second section for engaging the breakaway hinge and adjusting the second section and providing for a height adjustment of the second section relative to the first section.

28. The breakaway hinge of claim 27, wherein the connecting member comprises a plate, a pair of rod carrying bores positioned on opposite ends of the plate at the angle α and the angle θ, respectively, with respect to a vertical line, and further comprising a pivot rod positioned within each one of the rod carrying bores.

\* \* \* \* \*